(12) United States Patent
Curlander et al.

(10) Patent No.: US 10,388,155 B2
(45) Date of Patent: *Aug. 20, 2019

(54) LANE ASSIGNMENTS FOR AUTONOMOUS VEHICLES

(71) Applicant: Amazon Technologies, Inc., Seattle, WA (US)

(72) Inventors: James Christopher Curlander, Mercer Island, WA (US); Ryan Scott Russell, Bellevue, WA (US); Allan Scott Bathurst, Seattle, WA (US); Udit Madan, Seattle, WA (US); Jules Cook Graybill, Seattle, WA (US); Jonathan Blair Norwood, Seattle, WA (US); Wesley Scott Lauka, Seattle, WA (US); Pragyana K. Mishra, Seattle, WA (US); Darren Ernest Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,648

(22) Filed: Jan. 13, 2017

(65) Prior Publication Data
US 2017/0148316 A1 May 25, 2017

Related U.S. Application Data

(63) Continuation of application No. 14/945,555, filed on Nov. 19, 2015, now Pat. No. 9,547,986.

(51) Int. Cl.
G08G 1/09 (2006.01)
G05D 1/00 (2006.01)
G05D 1/02 (2006.01)
G01C 21/34 (2006.01)
G01C 21/36 (2006.01)
G08G 1/04 (2006.01)
G08G 1/14 (2006.01)

(52) U.S. Cl.
CPC .......... *G08G 1/09* (2013.01); *G01C 21/3492* (2013.01); *G01C 21/362* (2013.01);
(Continued)

(58) Field of Classification Search
CPC ... G08G 1/04; G08G 1/09; G08G 1/14; G01C 21/3492; G01C 21/362; G01C 21/3658;
(Continued)

(56) References Cited

U.S. PATENT DOCUMENTS 8,738,213 B1 * 5/2014 Szybalski ............ B60W 50/14
701/28
8,855,847 B2 * 10/2014 Uehara ............... G01C 21/3691
701/25

(Continued)

FOREIGN PATENT DOCUMENTS

EP 2228779 9/2010

OTHER PUBLICATIONS

International Search Report dated Feb. 3, 2017 for Application No: PCT/US2016/060884.

Primary Examiner — Thomas G Black
Assistant Examiner — Luat T Huynh
(74) Attorney, Agent, or Firm — Athorus, PLLC

(57) ABSTRACT

Disclosed are various embodiments for coordination of autonomous vehicles in a roadway. A roadway management system can generate lane configurations for a roadway or a portion of the roadway. The roadway management system can determine the direction of travel for lanes in a roadway and direct autonomous automobiles to enter the roadway in a particular lane.

21 Claims, 8 Drawing Sheets

(52) U.S. Cl.
CPC ....... *G01C 21/3658* (2013.01); *G05D 1/0022* (2013.01); *G05D 1/0088* (2013.01); *G05D 1/0212* (2013.01); *G05D 1/0276* (2013.01); *G08G 1/04* (2013.01); *G08G 1/14* (2013.01)

(58) Field of Classification Search
CPC .. G05D 1/0022; G05D 1/0088; G05D 1/0212; G05D 1/0276
USPC .......................................... 701/23, 24, 301
See application file for complete search history.

(56) References Cited

U.S. PATENT DOCUMENTS

| | | | |
|---|---|---|---|
| 9,558,664 B1 * | 1/2017 | Gaebler | G01C 21/3492 |
| 2008/0161986 A1 | 7/2008 | Breed | |
| 2014/0188376 A1 * | 7/2014 | Gordon | G08G 1/09 |
| | | | 701/118 |
| 2014/0278052 A1 | 9/2014 | Slavin et al. | |
| 2015/0153735 A1 * | 6/2015 | Clarke | B60W 30/00 |
| | | | 701/301 |
| 2015/0241878 A1 | 8/2015 | Crombez et al. | |
| 2015/0268665 A1 * | 9/2015 | Ludwick | B60Q 5/008 |
| | | | 701/23 |
| 2015/0345966 A1 | 12/2015 | Meuleau | |
| 2015/0345971 A1 * | 12/2015 | Meuleau | G01C 21/3492 |
| | | | 701/25 |
| 2015/0346727 A1 * | 12/2015 | Ramanujam | B62D 15/0285 |
| | | | 701/23 |
| 2015/0348335 A1 * | 12/2015 | Ramanujam | G07C 5/006 |
| | | | 701/23 |
| 2016/0209845 A1 * | 7/2016 | Kojo | G01C 21/3407 |
| 2016/0370193 A1 * | 12/2016 | Maischberger | G01C 21/34 |
| 2017/0010613 A1 * | 1/2017 | Fukumoto | G08G 1/096827 |

\* cited by examiner

LANE ASSIGNMENTS FOR AUTONOMOUS VEHICLES

CROSS-REFERENCE TO RELATED APPLICATIONS

This application is a continuation of and claims the benefit of U.S. patent application Ser. No. 14/945,555, now U.S. Pat. No. 9,547,986, entitled "LANE ASSIGNMENTS FOR AUTONOMOUS VEHICLES," and filed Nov. 19, 2015, which is hereby incorporated by reference in its entirety.

BACKGROUND

Autonomous vehicles can facilitate efficient transportation networks. Reversible or reconfigurable lanes can also facilitate efficient traffic flow through roadways in a roadway network. Autonomous vehicles may not have information about reversible lanes when approaching a portion of a roadway that has reversible lanes. Additionally, an autonomous vehicle may be unaware of an optimal lane at which to enter a roadway that has reversible lanes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to on-road coordination of autonomous vehicles through a roadway or a portion of a roadway. An autonomous vehicle relates to a self-driving vehicle that is capable of operation without human input. An autonomous vehicle can be a passenger automobile, mass-transit vehicle, a commercial vehicle, street cleaning vehicle, law enforcement vehicle, emergency vehicle, or any other type of vehicle that can operate on a road. An autonomous vehicle can also include vehicles that are not traditionally thought of as transportation vehicles. For example, an autonomous vehicle can include a trash dumpster, a vacuum cleaner, a lawnmower, or any other type of vehicle or apparatus that can be equipped with a drive system and components that facilitate navigation through roadways.

According to some embodiments of the present disclosure, autonomous vehicles can be coordinated while on roadways by one or more roadway management systems associated with a roadway network. The roadway management systems can configure lanes of a roadway and assign usage of lanes within the roadway to autonomous vehicles based upon a capability of the autonomous vehicle, a speed of the autonomous vehicle, a destination of the autonomous vehicle, a priority assigned to the autonomous vehicle, a number of occupants, a direction of travel, or other factors. An autonomous vehicle can request usage of a portion of a roadway from a roadway management system that is tasked with managing the portion of the roadway by submitting a request to use the roadway to the roadway management system over a network. A roadway management system can assign usage of a roadway to an autonomous vehicle by assigning a particular lane in a portion of a roadway during a particular period of time and at a particular velocity or velocity range.

For example, assume that an autonomous vehicle is approaching a roadway or a particular portion of a roadway. The autonomous vehicle can identify a roadway management system that is assigned to the portion of the roadway and submit a request to use the roadway to the roadway management system. The roadway management system can identify a period of time and a particular lane of the roadway that is best suited to assign to the autonomous vehicle while taking into account an outcome directive. The outcome directive can be a directive to maximize traffic flow through the roadway, maximize toll or parking revenue, maximize a speed of vehicles moving through the roadway, or a combination of various factors. Upon performing an analysis of the current state of the roadway and of the autonomous vehicle, the roadway management system can assign a particular lane or a portion of a lane during a particular period of time to the autonomous vehicle.

In the following discussion, a general description of the system and its components is provided, followed by a discussion of the operation of the same.

Figure 1A:
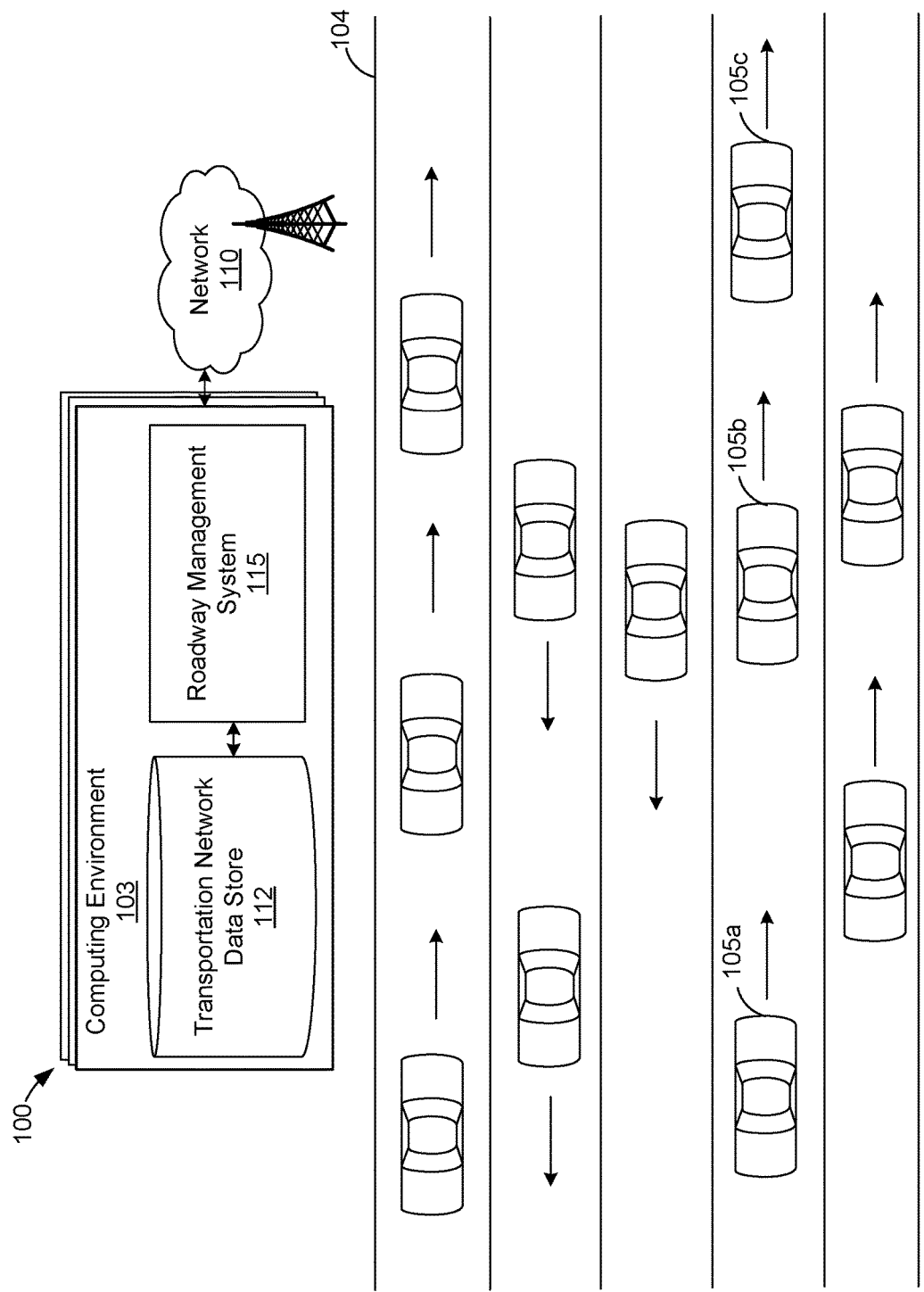
FIGS. 1A-1C illustrate a networked environment including autonomous vehicles according to various embodiments of the present disclosure.

FIG. 1A illustrates a networked environment 100 for coordination of autonomous vehicles in a roadway. The networked environment 100 includes a computing environment 103, a roadway 104, a network 110, and a plurality of vehicles 105 (e.g., 105a, 105b, 105c). As shown in FIG. 1A, the computing environment 103 includes a transportation network data store 112 and a roadway management system 115.

The vehicles 105 can be embodied as any type of vehicle, including but not limited to cars, trucks, vans, buses, street cars, helicopters, trains, subways, aircrafts, boats, etc., regardless of how powered or driven. Each vehicle 105 includes an autonomous vehicle controller that controls its maneuvering operations on surface streets, highways, skyways, parking lots, waterways, etc. The autonomous vehicle controller may also control additional components within the vehicle that allow the vehicle to be repurposed to perform a variety of tasks. The autonomous vehicle controllers of the vehicles 105 are in communication with the roadway management system 115 via the network 110 and receive instructions related to which lane within the roadway 104 that a respective vehicle 105 is assigned and a time at which the vehicle 105 is assigned to the lane.

The vehicles 105 can request usage of a portion of the roadway, and the roadway management system 115 can assign usage of a portion of the roadway to vehicles 105 in a manner that can optimize for traffic flow, safety, and other considerations. A request to use a portion of a roadway from a vehicle 105 can include environmental data about the surroundings of a vehicle 105 and about the vehicle 105 itself. For example, the vehicle 105 can capture data about whether other vehicles 105 are in its vicinity or in close proximity to the vehicle 105, a location of the vehicle 105, a velocity of the vehicle 105, an orientation of the vehicle 105, a number and makeup of passengers, information about cargo of the vehicle 105, a size and weight of the vehicle, and other data.

The vehicle 105 can include this environmental data in a request to use a portion of the roadway. Additionally, a request to use a portion of the roadway can further include a requested destination of the vehicle 105, whether the destination terminates within or near the roadway or whether the vehicle 105 merely requires transit through a portion of a roadway managed by the roadway management system 115 to another portion of another roadway that is managed by another roadway management system 115. The request can also include a priority associated with the request. For example, a law enforcement vehicle or emergency vehicle responding to an emergency situation or involved in law enforcement activities can be associated with a higher priority than other vehicles 105. As another example, a public transportation vehicle 105 can be assigned a higher priority than a personal transport vehicle 105. As yet another example, a vehicle 105 that is paying a toll or user fee to use the roadway 104 can be assigned a higher priority than another vehicle 105 that is not paying the toll or that is paying a lower toll rate.

The vehicle 105 can submit a request to use a portion of the roadway 104 to the roadway management system 115. The roadway management system 115 can be tasked with identifying when the vehicle 105 can safely use the roadway without endangering other vehicles while optimizing for a certain outcome directive. The roadway management system 115 can make such a determination by analyzing a state of the roadway and its various travel lanes and assigning a requesting vehicle entrance to the roadway at a particular lane at a particular time and at a particular velocity or velocity range.

The roadway management system 115 can also assign a lane configuration to the various lanes of the roadway 104. As can be seen in FIG. 1A, the roadway 104 has multiple lanes that can be assigned a lane configuration by the roadway management system 115. The lane configuration can be assigned to help optimize for the outcome directive. Lanes can be reversible when the roadway management system 115 determines that reversing a direction of travel would further the outcome directive. For example, a particular lane can be designated as a westbound travel lane during a certain time of the day by the roadway management system 115 and as an eastbound travel lane during another time of day. The direction of travel may be changed or reversed many times in a day and can even vary by the minute depending upon traffic conditions and the demands of other users and vehicles 105 of the roadway.

Therefore, in the example of FIG. 1A, the roadway management system 115 can generate a roadway assignment that provides the vehicles 105a, 105b, 105c, and other autonomous vehicles with an assignment to a particular lane of the roadway 104 at a particular time and at a particular velocity or velocity range. In one example, the roadway assignment can be considered permission for a particular vehicle 105 to enter the roadway at a particular time and travel along the roadway at a particular velocity, at a particular maximum velocity, or a velocity range.

Figure 1B:
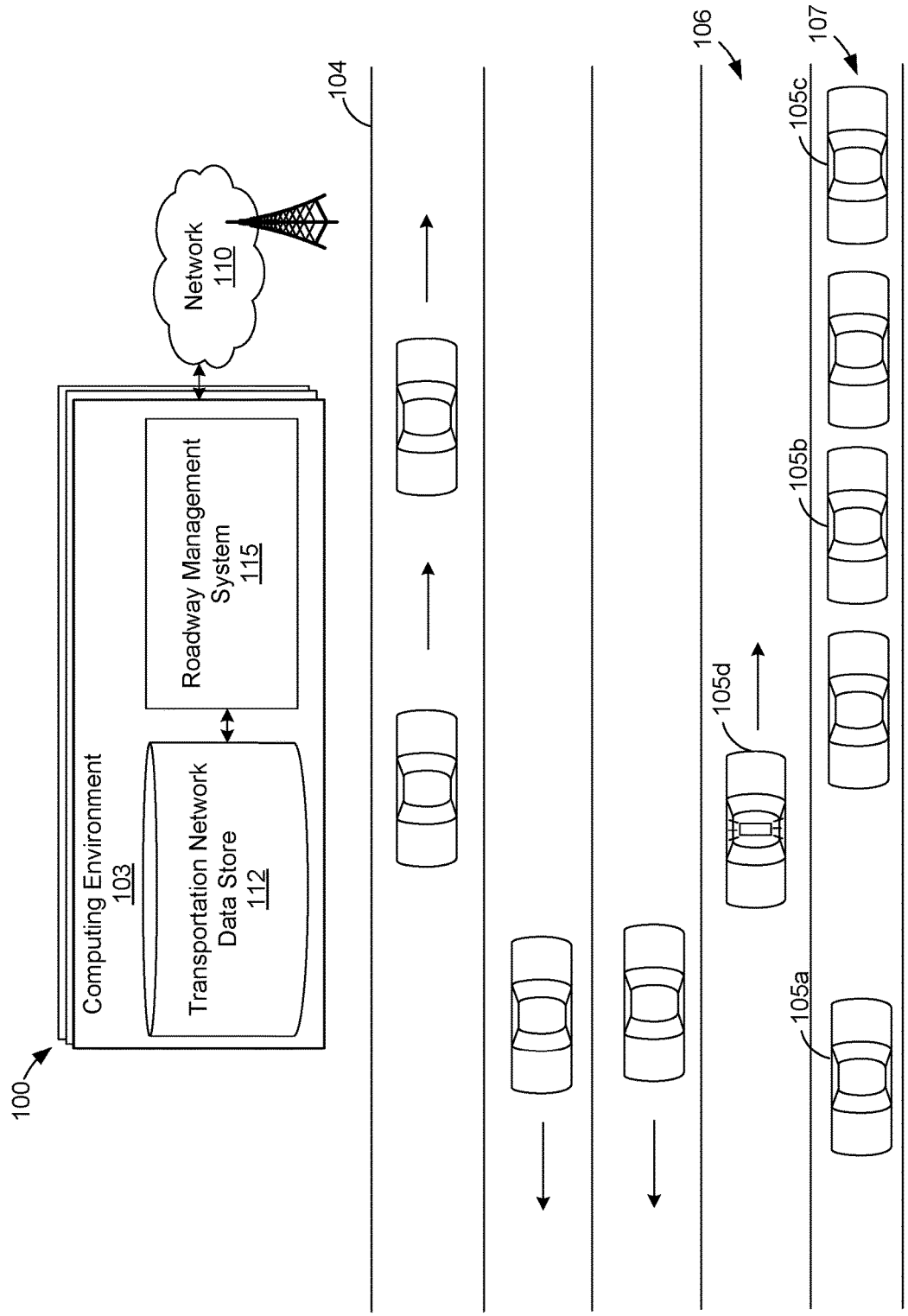

Continuing the example of FIG. 1A, reference is now made to FIG. 1B. FIG. 1B illustrates the roadway 104 shown in FIG. 1A in an alternative scenario. In FIG. 1B, vehicle 105d represents an emergency vehicle that requires use of the roadway. The vehicles 105a, 105b, 105c are directed by the roadway management system 115 to move from lane 106 to lane 107 because the vehicle 105d has requested use of the roadway 104 in a particular travel direction and is associated with a higher priority use than the vehicles 105a, 105b, 105c. In some examples, the roadway management system 115 can determine a priority of the vehicle 105d or a use of the vehicle 105d based upon a vehicle identifier or other data that is not included in a request received from the vehicle 105d.

Accordingly, the roadway management system 115 can generate and transmit an update to the previous roadway assignment that assigned the vehicles 105a, 105b, 105c to lane 106. In this scenario, the roadway assignment can include an identification of the lane 107 as well as a time that the vehicles 105a, 105b, 105c should enter the lane 107. The roadway management system 115 can also generate a roadway assignment for the vehicle 105d that identifies the lane 106 to which the vehicle 105d has been assigned and a time at which the vehicle 105d is to enter the lane 106.

As shown in FIG. 1B, there are other vehicles 105 within the lane 107. Therefore, in some examples, the roadway management system 115 can generate updated roadway assignments for the other vehicles 105 to adjust the respective velocities to provide for the safe merging of the vehicles 105a, 105b, 105c within the lane 107. In another scenario, the roadway management system 115 can instruct the vehicles 105a, 105b, 105c to move to lane 107 and rely upon the autonomous navigation features associated with the vehicles 105 entering the lane 107 and the vehicles 105 already in the lane 107 to safely merge with one another.

In some embodiments, the roadway management system 115 can be implemented as a distributed system where multiple instances of the roadway management system 115 are responsible for different respective portions of a transportation network. For example, a first instance of a roadway management system 115 can be responsible for a particular roadway segment and manage the lanes and vehicles 105 that enter this roadway segment. A second instance of a roadway management system 115 can be responsible for an adjacent roadway segment. Other examples and variations of how a vehicle 105 and various roadway management systems 105 can operate are provided below.

Figure 1C:
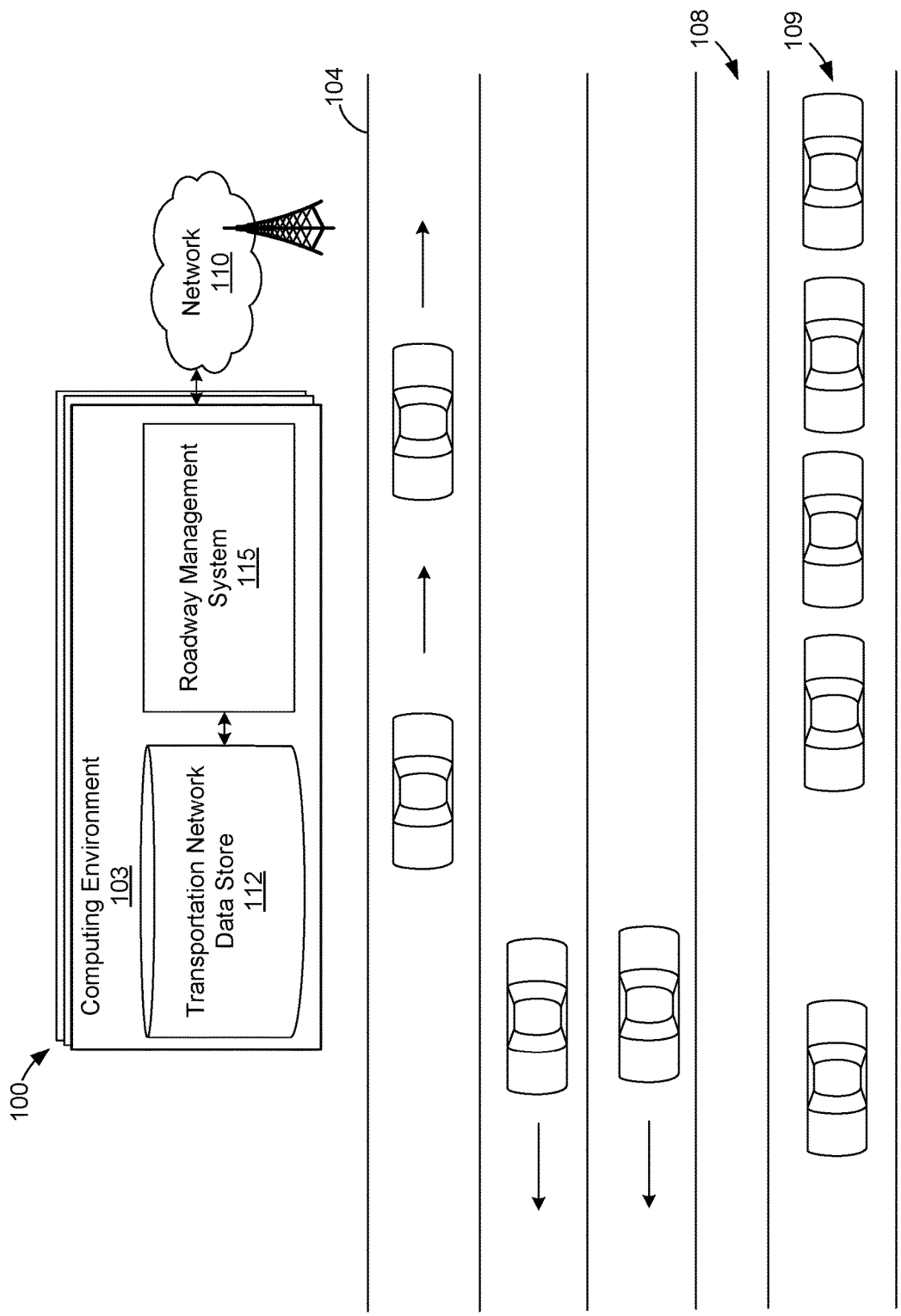

Referring now to FIG. 1C, shown is an example of how the roadway management system 115 can generate various types of lane configurations for the various lanes of the roadway 104. As shown in the previous examples of FIGS. 1A-1B, the lanes had a fixed width and flexible directional configurations. In the example of FIG. 1C, the lanes 108 and 109 of the roadway 104 are shown to have flexible widths. In this way, the roadway management system 115 can vary the width of a lane of the roadway 104 depending upon the types of vehicles that request usage of the roadway 104. For example, wide-bodied vehicles may request usage of a roadway, so the roadway management system 115 can increase the width of a lane relative to other lanes of the roadway. In another example, a particular lane, such as lane 108, can be configured for usage by two-wheeled vehicles such as motorcycles and bicycles, which can result in a narrower lane width.

Figure 2:
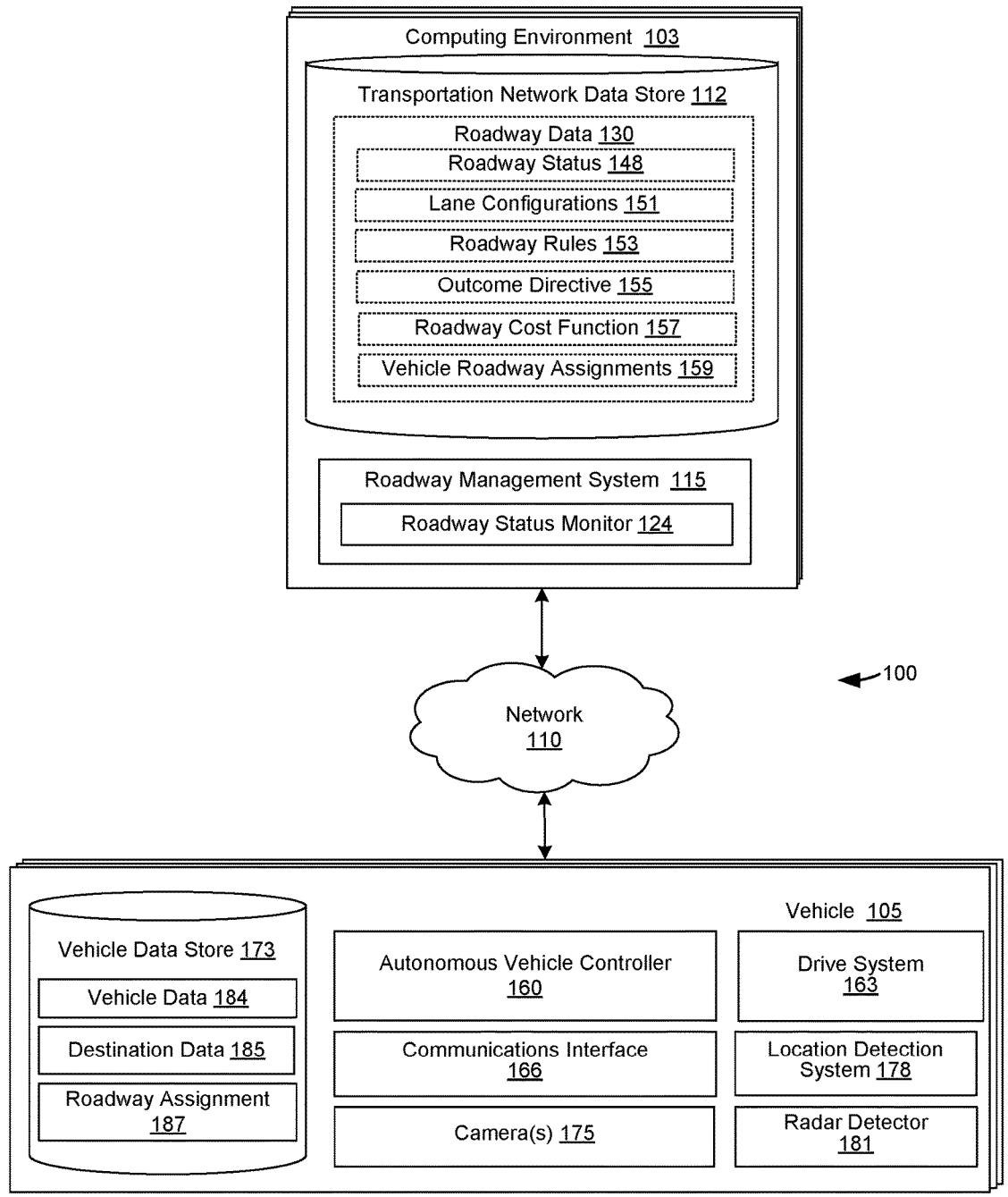
FIG. 2 illustrates an alternative view of the networked environment of FIG. 1 according to various embodiments of the present disclosure.

Turning now to FIG. 2, an alternative view of the networked environment 100 in FIGS. 1A-1C is illustrated according to various embodiments of the present disclosure. The networked environment 100 includes the computing environment 103, the network 110, and the vehicle 105 in data communication via the network 110. The network 110 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in the transportation network data store 112 that is accessible to the computing environment 103. The transportation network data store 112 may be representative of a plurality of data stores 112 as can be appreciated. The data stored in the transportation network data store 112, for example, is associated with the operation of the various applications and/or functional entities described below.

The components executed on the computing environment 103, for example, include the roadway management system 115, and other applications, services, processes, systems, engines, or functionality not discussed in detail herein. The roadway management system 115 includes a roadway status monitor 124.

The roadway status monitor 124 is executed to monitor and analyze the status of a roadway that is managed by the roadway management system 115. For example, the roadway status monitor 124 can obtain data from various roadway sensors. Roadway sensors can include traffic cameras, in-ground vehicle sensors, such as inductive sensors, motion detectors, or other sensors or devices that are associated with a roadway 104. The roadway status monitor 124 can provide data from which the roadway management system 115 can generate configuration for lanes of a roadway and generate roadway assignments for vehicles 105. For example, the roadway status monitor 124 can determine traffic conditions or a volume or quantity of vehicles 105 that are within a roadway segment. The roadway status monitor 124 can determine an average velocity of vehicles 105 that are within a roadway segment. The roadway status monitor 124 can also determine whether obstructions, damage or other factors are affecting road conditions of one or more lanes within a roadway segment.

The roadway management system 115 can generate lane configurations for lanes within roadways 104 and roadway assignments for vehicles 105 requesting use of one or more roadways 104 managed by the roadway management system 115. Lane configurations represent how lanes of a roadway 104 are configured and used by vehicles 105. For example, a lane configuration can represent a direction of travel, or restrictions on the type of vehicles 105 permitted in a lane. For example, a lane configuration for a particular lane may specify that only mass transportation, high-occupancy vehicles or carpools are permitted in a particular lane. A lane configuration can also include an indication that a particular lane or portion of a lane in a roadway 104 is a parking lane where vehicles 105 are permitted to park.

Based upon the data obtained from the roadway status monitor 124 as well as requests from vehicles 105 to use a portion of the roadway, the roadway management system 115 can generate roadway assignments for vehicles 105 and lane configurations for lanes within a roadway 104. Additional detail with respect to how the roadway management system 115 can generate roadway assignments and lane configurations is provided below.

The data stored in the transportation network data store 112 includes, for example, roadway data 130 and potentially other data. The roadway data 130 includes data about one or more roadways or portions of roadways that the roadway management system 115 manages and/or monitors. A roadway or a portion of a roadway can include a stretch of public or private road, a sidewalk, a bridge, a tollway, a freeway, a parking lot, or any other stretch of roadway on which vehicles can move. The roadway data 130 can include mapping and location data associated with the roadways managed by the roadway management system 115.

The roadway status 148 within the roadway data 130 includes status information associated with the roadway. Roadway status 148 can be generated by or retrieved from the roadway status monitor 124 based upon traffic cameras, in-ground or above-ground vehicle sensors, motion detectors, telemetry data from vehicles 105 on the roadway, road construction data, lane closure data, law enforcement or emergency agency data sources, weather data sources or weather forecasting data sources, or other sources. The roadway status 148 reflects traffic conditions, weather conditions, and whether there are lane closures or other forms of road construction or obstructions that may affect how vehicles 105 should be assigned to lanes within the roadway. Roadway status 148 can also include a quantity of vehicles 105 in the roadway and in the respective lanes of the roadway. Roadway status 148 can further include a velocity of individual vehicles 105 or an average velocity of vehicles 105 in the respective lanes of the roadway.

Lane configurations 151 reflect data regarding lanes within the roadway. Lane configurations 151 can specify a direction of travel of a particular lane within the roadway. For example, a lane within the roadway can be specified as a reversible lane. Accordingly, a particular lane can have a lane configuration 151 in a first direction of travel or a second direction of travel. A lane can also be configured as a parking lane where vehicles 105 can park. In some scenarios, a lane may be configured as a parking lane during low traffic conditions and as a travel lane during high traffic conditions. Certain lanes within the roadway may be designated as not reversible and as a permanent travel lane in a particular travel direction. Additionally, in some embodiments, the roadway management system 115 can adjust the width of a lane of the roadway. The roadway management system 115 can generate a lane configuration 151 for the various lanes in a roadway based upon an analysis of the roadway status 148, other roadway data 130, and requests from vehicles 105 to use the roadway.

Roadway rules 153 reflect constraints associated with a roadway. The roadway rules 153 can specify certain lane configurations 151 for lanes that are required at certain times of day. Roadway rules 153 can also specify tolls, if any are associated with a roadway, that a vehicle 105 must pay in order to traverse the roadway, or a particular lane of the roadway. In some examples, the roadway rules 153 can specify that the roadway management system 115 can employ a demand-based toll pricing model, where vehicles 105 requesting faster passage through the roadway can receive higher priority roadway assignments depending on how much the vehicle pays or offers to pay in tolls. Roadway rules 153 can also specify parking rates for the roadway should lanes within the roadway be configured as parking lanes by the roadway management system 115.

Roadway rules 153 can specify whether, during certain times of day, restrictions are imposed on the type of occupancy of vehicles 105 that are permitted on the roadway. For example, during certain times of day, a roadway rule 153 may specify that only high occupancy vehicles and public transit vehicles are permitted on a roadway. As another example, a roadway rule 153 can specify that commercial vehicles carrying freight are only permitted on the roadway during limited hours. The roadway management system 115 can take into account roadway rules 153 that may specify constraints or restrictions when assigning lane configurations 151 or when generating roadway assignments for vehicles 105.

The outcome directive 155 reflects a particular outcome associated with the roadway that the roadway management system 115 optimizes for when making roadway assignments and lane configurations 151. For example, the outcome directive 155 can instruct the roadway management system 115 to optimize for maximizing road throughput, or a quantity of vehicles 105 that pass through the roadway over a period of time. As another example, the outcome directive 155 can instruct the roadway management system 115 to optimize for maximizing toll revenue. The outcome directive 155 can also specify that the roadway management system 115 should optimize for maximizing the velocity or average velocity of cars through the roadway. In some embodiments, there can be different outcome directives 155 for different times of the day and/or different lanes within the roadway. For example, during rush hour, the roadway management system 115 can optimize for maximizing road throughput. During other times of the day, the roadway management system 115 can optimize for maximizing toll or parking revenue.

The roadway cost function 157 is a cost function associated with use of the roadway that the roadway management system 115 can use to determine lane configurations and roadway assignments. The roadway cost function 157 takes into account the number of lanes in the roadway, speed limits associated with the roadway, or a throughput metric associated with the roadway, which can be expressed as a maximum number of vehicles 105 that can use the roadway over a period in time. The roadway cost function 157 can also take into account a quantity of vehicles 105 that are already on the roadway and the their respective direction of travel, whether they are parked on the roadway, and a priority associated with their use of the roadway. The roadway cost function 157 can take into account factors that affect the roadway, the vehicles, and other external factors, such as weather or roadway conditions.

Upon receiving a request to use the roadway from the vehicle 105, the roadway management system 115 can use roadway cost function 157 to determine whether and where to assign a vehicle 105 to use the roadway. In one example, in response to receiving a request to use the roadway, the roadway management system 115 can generate a roadway assignment that has the least cost impact based upon the roadway cost function 157. The roadway cost function 157 can take into account factors associated with use of a particular lane of the roadway as well as the impact of a particular vehicle's use of the various lanes of the roadway. For example, roadway cost function 157 can take into account preferences of an occupant of a vehicle 105, the capabilities of the vehicle 105, the status of the roadway, and the status of the environment in which the roadway is situated. Upon receiving a request to use the roadway, the roadway management system 115 can select a lane assignment from among the various lanes of the roadway that minimizes the cost to use the roadway according to the roadway cost function 157. Additionally, the roadway management system 115 can also update the lane assignments of all of the vehicles using the roadway based upon the roadway cost function 157, as introducing a new vehicle 105 into the roadway may affect the outcome of their use of the roadway according to the roadway cost function 157.

Vehicle roadway assignments 159 represent roadway assignments for vehicles 105 on the roadway. The vehicle roadway assignments 159 can specify an identifier for a particular vehicle 105, an identifier for a lane within the roadway, and a time that the vehicle 105 is permitted to use the lane. A vehicle roadway assignment 159 can also specify a velocity or velocity range that the vehicle 105 is permitted to travel on the roadway as well as a direction of travel that the vehicle 105 is permitted to travel in its assigned lane. In some cases, a vehicle 105 can be assigned permission to park in a lane in the roadway. Accordingly, in this scenario, the vehicle roadway assignment 159 can reflect that the vehicle is permitted to park in the roadway and potentially assign a parking spot within the roadway to the vehicle 105.

The vehicle 105 can include an autonomous vehicle controller 160, a drive system 163, a communications interface 166, a vehicle data store 173, camera 175, location detection system 178, a radar detector 181, and/or other vehicle related components. The autonomous vehicle controller 160 may be embodied as analog, digital, or mixed analog and digital processing circuitry and memory that direct the operation of the vehicle 105 and the electromechanical drive system 163 of the vehicle. In that sense, the autonomous vehicle controller 160 is an example of an embedded real-time control system in which control outputs are produced in response to control input conditions. The autonomous vehicle controller 160 may include various sensors, such as, for example, cameras, three-dimensional (3D) laser scanners, laser illuminated detecting and ranging sensors (LIDAR), radar, range scanners, 3D depth sensing devices, etc., which may be relied upon to analyze the surrounding environment, develop control signals for operation of the drive system 163, detect an occurrence of an event (e.g., brush fire, car accident, etc.), and/or other actions. Among various embodiments, the autonomous vehicle controller 160 may perform the processing necessary to direct operation of the vehicle 105 alone or in tandem with other computing systems, including but not limited to the drive system 163, the computing environment 103, and/or other computing devices and systems. The autonomous vehicle controller 160 may include other applications, services, processes, systems, engines, or functionality not discussed in detail herein.

The autonomous vehicle controller 160 may access the included memory areas, including the vehicle data store 173, that store data used for navigation of the vehicle 105, such as street image or view data, roadway data, navigation data, etc. The autonomous vehicle controller 160 is configured to use feedback from its sensors and the drive system 163, for example, to develop an appropriate and suitable route for travel. The route may be determined primarily from a destination location submitted by a passenger of the vehicle or any other user or device that can direct the activities of the vehicle 105.

Among the embodiments, the autonomous vehicle controller 160 may be integrated with the drive system 163 of the vehicle 105 in any suitable manner to permit the autonomous vehicle controller 160 to control the operations of the vehicle 105, including but not limited to the acceleration, braking, turning, signal and lamp operation, etc. In that sense, the autonomous vehicle controller 160 may be electrically, mechanically, and electromechanically integrated with the drive system 163 and the other elements of the vehicle 105.

The drive system 163 may be embodied as the powertrain and associated electrical, mechanical, hydraulic, electromechanical, control, and diagnostic systems of the vehicle 105. Thus, the drive system 163 may include one or more engines, motors, transmissions, steering, braking, and other systems to control the movement of the vehicle 105 on surface streets, parking lots, off-road surfaces, etc. As noted above, the drive system 163 operates the vehicle 105 at the direction of the autonomous vehicle controller 160.

The communications interface 166 may be embodied as one or more physical layer communications systems and associated software interfaces for communication between the vehicle 105, the computing environment 103, and/or other vehicles 105 via the network 110. In that context, the communications interface 166 may include one or more wired or wireless (e.g., cellular, satellite, WiFi®, Bluetooth®, etc.) communications interfaces. Among other data, the communications interface 166 may be relied upon to transmit requests to use a portion of a roadway to a roadway management system 115 that is assigned to manage the roadway. The communications interface 166 may also be employed to facilitate vehicle 105 to vehicle 105 communications where an autonomous vehicle controller 160 of a first vehicle 105 can communicate with an autonomous vehicle controller 160 of another vehicle 105 to facilitate navigation through a roadway and to eliminate vehicle collisions.

The data stored in the vehicle data store 173 includes vehicle data 184, a roadway assignment 187, and destination data 185. The vehicle data 184 can include any information or data about the vehicle 105 or the status of the vehicle 105 that can be used to facilitate navigation or assigning the vehicle 105 to lanes in a roadway. Vehicle data 184 can include a vehicle identifier such as, for example, a vehicle identification number (VINs) and/or other type of unique identifier used to identify the vehicle 105. The vehicle data 184 can further include a vehicle type that includes make, model, and/or other vehicle related information. The vehicle data 184 can further include operational capabilities of the vehicle, such as its size and weight, its passenger capacity, its acceleration capability or its velocity capabilities. The vehicle data 184 can also include a vehicle history that contains history, maintenance history, and/or any type of history related information.

Vehicle data 184 can also include telemetry data received from the autonomous vehicle controller of the vehicle 105. The telemetry data may include, existing route data, planned stop data, resource supplies (e.g., fuel level, battery capacity), fuel efficiency, a propulsion type, location data, system diagnostic data and/or other relevant telemetry information related to the vehicle 105. For example, the system diagnostic data may include on-board diagnostic (OBD) measurement data from the vehicles 105 such as, for example, diagnostic trouble codes, fuel efficiency, vehicle speed, revolutions per minute (RPM), emissions, radar sensor data, and/or other information.

Vehicle data 184 can further include passenger information that includes information about the current passengers, previous passengers, and/or future passengers of the vehicle 105. The passenger information may be determined based at least in part on image and/or voice recognition software, input data, predefined passenger profile information, etc. For example, a camera within the passenger cabin may be able to capture an image of the passengers. To identify the passengers, the image may be analyzed via image recognition software. The passenger information may then be stored in the vehicle data store 173 and/or sent to the roadway management system 115.

The cameras 175 may be embodied as one or more cameras having a field of view within the passenger cabin of the vehicle 105 and a field of view outside the vehicle 105. Using the cameras 175, still images and/or video may be relayed from the vehicle 105 to the computing environment 103, where it may be captured by the roadway status monitor 124. The images and/or video may be relied upon by the roadway management system 115 to determine roadway assignments for a vehicle by identifying whether vehicles 105 are in the same lane or neighboring lanes in the vicinity of a vehicle 105. Thus, video monitoring and continuous recording may be relied upon for both the inside and outside of the vehicles 105.

The location detection system 178 may be embodied as a global positioning system (GPS) receiver, Global Navigation Satellite System (GLONASS), or other type of location finding system that is configured to identify the geographic location of the vehicles 105 as they move from place to place. The radar detector 181 may be embodied as a device configured to monitor the speed of the vehicle 105 itself and/or other vehicles 105 around the vehicle. The autonomous vehicle controller 160 can use radar data, data from cameras, and/or location data to navigate within lanes of a roadway.

Destination data 185 identifies a destination associated with the vehicle 105. The destination can be set by a user or passenger of the vehicle or another system or person. The destination can reflect a geographic location or point of interest. The destination can also reflect a request to park at or near a particular geographic location or point of interest. Within the destination data 185, user or vehicle 105 preferences can also be stored with respect to how a route should be mapped or requested. For example, a user of a vehicle 105 may prefer the fastest route by average velocity or total trip time. The user may prefer a route where no tollways are taken. The user may prefer to pay additional tolls or fees to speed the route of a vehicle 105 to a destination. Based upon the destination data 185, the autonomous vehicle controller 160 can generate a route and generate requests to use roadways that are on the route on behalf of the vehicle 105.

The requests are transmitted to a roadway management system 115 that manages a particular roadway on the route generated by the autonomous vehicle controller 160. The roadway management system 115 can obtain the request and determine when and in which lane of the roadway the vehicle 105 can use the roadway.

The roadway assignment 187 represents one or more assignments to one or more roadways that are within the route of the vehicle 105. A roadway assignment 187 can represent an assignment received from the roadway management system 115 that assigns the vehicle 105 a particular lane within a particular roadway at a particular time at a particular velocity or velocity range and in a particular direction of travel. Multiple roadway assignments 187 can be stored within the vehicle data store 173 that correspond to the various roadways used by the vehicle 105 to navigate to its destination.

Next, a description of how the roadway management system 115 and autonomous vehicle controller 160 can facilitate on-road coordination of vehicles is provided. To begin, a vehicle 105 can map a route to a destination specified by a user using mapping data that can be retrieved or stored by the autonomous vehicle controller 160. The autonomous vehicle controller 160 can then identify a roadway management system 115 that is responsible for a roadway or a portion of the roadway that it needs to traverse in order to reach its destination. The autonomous vehicle controller 160 can identify the appropriate roadway management system 115 by consulting mapping data that identifies a roadway management system 115 responsible for a particular roadway by network address or other addressable mechanism. In an alternative scenario, the appropriate roadway management system 115 can identify itself to a vehicle 105 by broadcasting a message to the vehicle 105 over the network 110 as the vehicle 105 nears the roadway. In some examples, a roadway management system 115 is not assigned to every roadway or portion of a roadway on a route of a vehicle 105. In some scenarios, only the most heavily trafficked roadways may be assigned to a roadway management system 115 to optimize traffic flow and/or maximize revenue metrics associated with the roadway, such as toll revenue or parking revenue.

The autonomous vehicle controller 160 can generate a request to use the roadway as it nears the roadway managed by the roadway management system 115 or well in advance of nearing the roadway. The request can include vehicle data 184 associated with the vehicle 105, such as an occupancy of the vehicle, the vehicle capabilities, vehicle size or weight, information about cargo of the vehicle, or any other state data associated with the vehicle 105. In some scenarios, the request can identify factors associated with the vehicle that can be taken into account by the roadway management system 115 using the roadway cost function 157. The factors associated with the vehicles that can be incorporated into the roadway cost function 157 can be stored as vehicle data 184 and can be related to a cost to use the roadway that can be attributed to the vehicle 105. In some embodiments, the roadway management system 115 can store cost function factors that can be used for various vehicle types that can be used in the roadway cost function 157 to determine a cost to use the roadway based upon the vehicle data 184.

In response to receiving the request from the vehicle 105, the roadway management system 115 can generate a roadway assignment 187 that is transmitted to the vehicle 105 over the network 110. The roadway management system 115 can generate a roadway assignment 187 by factoring the cost to use the roadway using the roadway cost function 157 of the roadway while optimizing use of the roadway according to the outcome directive 155. In one embodiment, the roadway management system 115 can generate a roadway assignment 187 that minimizes a cost to use the roadway based upon the roadway cost function 157 and that achieves the outcome directive 155. In some scenarios, the request from the vehicle 105 can include an amount that the vehicle 105 is bidding to use the roadway, which can be factored into the roadway cost function 157 to minimize the cost to use the roadway or maximize a revenue metric. The roadway assignment 187 can be generated to maximize traffic flow or road throughput or maximize toll or parking revenue depending upon the outcome directive 155.

The request from the vehicle 105 can also include a priority associated with the vehicle 105 and/or its use of the roadway. For example, an emergency vehicle responding to an emergency can be associated with a higher priority than a passenger vehicle, so that the roadway management system 115 can assign the emergency vehicle to a lane that has a lower traffic volume or a higher average velocity. The roadway management system 115 can also generate and transmit updates to roadway assignments for vehicles 105 as the roadway status 148 changes. For example, should an accident cause congestion in a first lane, the roadway management system 115 can generate an updated roadway assignment 187 that instructs waiting vehicles to transition into a different lane. As another example, should an emergency vehicle or a vehicle 105 with a higher priority request access to the roadway, the roadway management system 115 can generate updated roadway assignments for vehicles 105 in the roadway that create passage for the emergency vehicle through the roadway.

The roadway management system 115 can also monitor the status of lanes within a roadway and assign lane configurations 151 to the lanes of the roadway based upon the roadway status 148 and the requests from vehicles 105 to use the roadway. For example, at a particular time of the day, a large number of requests may include a request to traverse the roadway in a first direction of travel. Accordingly, the roadway management system 115 can assign lane configurations 151 to a majority of the lanes in a roadway such that traffic flows in the first direction of travel. However, at a different, second time of day, a large number of requests may include a request to traverse the roadway in the opposite direction of travel. Accordingly, the roadway management system 115 can assign a lane configuration 151 to a majority of lanes so that traffic flows in the opposite direction during the second time of day. As an additional example, there may be sufficiently low volumes of vehicles 105 on a roadway that permit an outcome directive 155 to be achieved as well as allow vehicles 105 to park in one or more lanes of the roadway. Accordingly, the roadway management system 115 can assign a parking lane configuration 151 to one or more lanes of the roadway should such a condition exist.

In this way, the roadway management system 115 can continually monitor the roadway status 148 in order to generate updated lane configurations 151 and updated roadway assignments 187 in order to optimize for the outcome directive 155.

Figure 3:
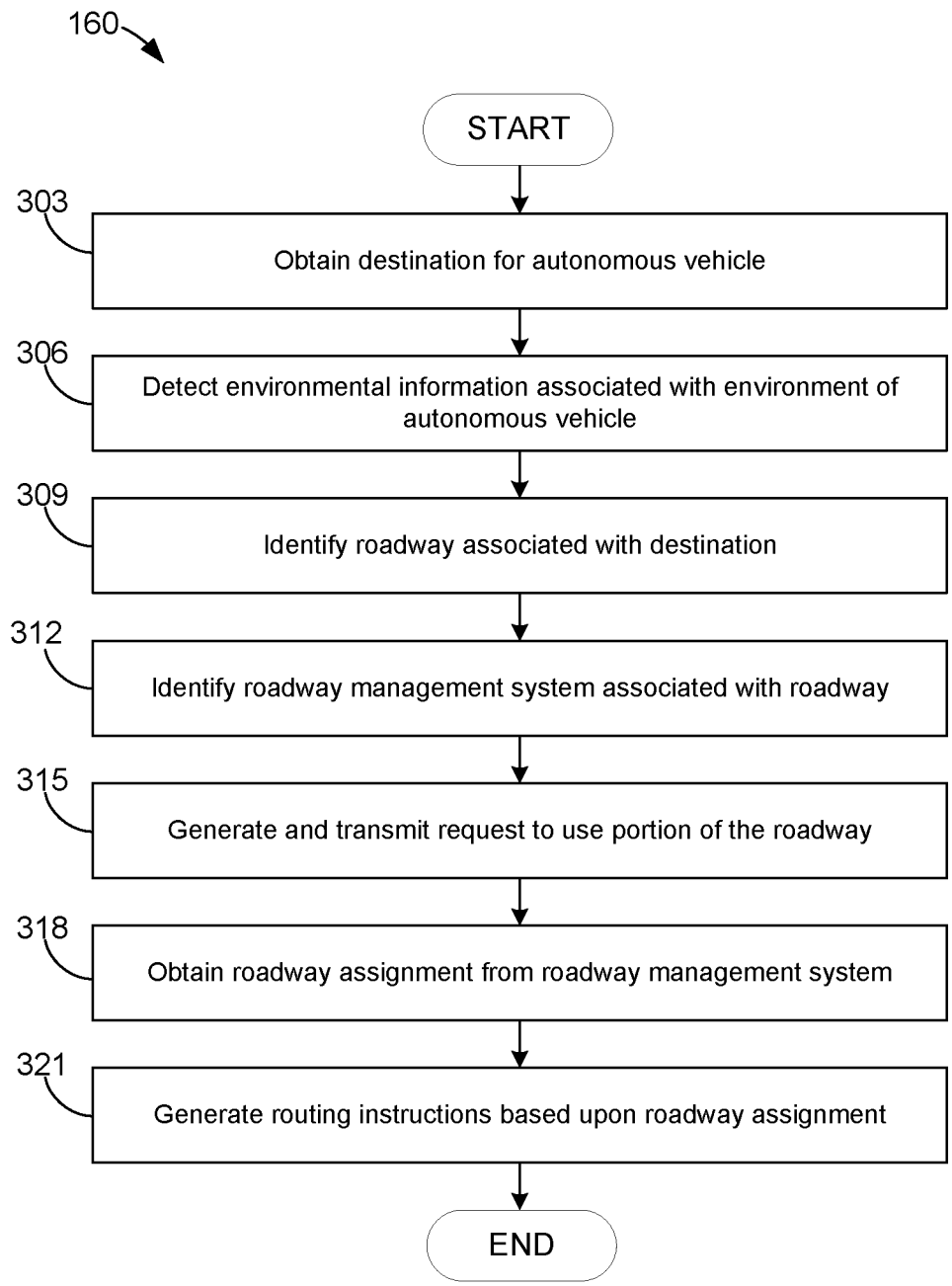
FIG. 3 is a flowchart illustrating one example of functionality implemented as portions of an autonomous vehicle controller executed in a vehicle in the networked environment of FIGS. 1A-1C and 2 according to various embodiments of the present disclosure.

Referring next to FIG. 3, shown is a flowchart that provides one example of the operation of a portion of the autonomous vehicle controller 160 according to various embodiments. It is understood that the flowchart of FIG. 3 provides merely an example of the many different types of functional arrangements that may be employed to implement the operation of the portion of the autonomous vehicle controller 160 as described herein. As an alternative, the flowchart of FIG. 3 may be viewed as depicting an example of elements of a method implemented in the vehicle 105 according to one or more embodiments.

FIG. 3 provides a non-limiting example of the functionality that may be performed by a vehicle 105. Specifically, FIG. 3 provides a non-limiting example of how a vehicle 105 can generate a request to use a roadway. At box 303, the autonomous vehicle controller 160 can obtain a requested destination associated with the vehicle 105. The destination can be obtained from the destination data 185 in the vehicle data store 173 or from a user input device. In some embodiments, the autonomous vehicle controller 160 can be directed to a particular destination by another autonomous vehicle or another automated process. For example, an automated scheduling or dispatching process can direct the vehicle 105 to a particular destination. In one embodiment, the dispatching process can direct the vehicle 105 to go to a particular location to pick up passengers, cargo, etc.

At box 306, the autonomous vehicle controller 160 can detect environmental information associated with the environment of the vehicle 105. For example, the autonomous vehicle controller 160 can obtain information about the immediate surroundings of the vehicle 105 from the various sensors of the vehicle 105. For example, the environmental information can include information about surrounding or nearby vehicles 105 that may assist the roadway management system 115 to generate a roadway assignment 187 to optimize for the outcome directive 155. Additionally, the environmental information can include any other vehicle data 184 that is maintained or captured by the vehicle 105. The autonomous vehicle controller 160 can also obtain a geographic location of the vehicle 105 from the location detection system 178.

At box 309, the vehicle 105 can identify a roadway associated with the requested destination. At box 312, the autonomous vehicle controller 160 can identify a roadway management system 115 that is assigned to manage the roadway or a portion of the roadway that is on the route of the vehicle 105 or that the vehicle 105 is approaching. In some embodiments, the autonomous vehicle controller 160 can identify the roadway management system 115 from mapping data that identifies the appropriate roadway management system 115 for a particular roadway. In other embodiments, the autonomous vehicle controller 160 can identify the nearest roadway management system 115 and query the roadway management system 115 to determine whether it is responsible for management of the roadway. In other examples, the roadway management system 115 can broadcast a communication over the network 110 to the vehicle 105 identifying itself as the roadway management system 115 associated with the roadway.

At box 315, the autonomous vehicle controller 160 can generate and transmit a request to use the roadway or a portion of the roadway. The request can be sent to the roadway management system 115 identified at box 312. The request can comprise a request to use a portion of the roadway and include the environmental information associated with the environment of the vehicle 105. The request can include any status data associated with the vehicle 105, such as location data, velocity data, vehicle capability data or any other vehicle data 184. The request can also include a priority or a priority request associated with the request to use the roadway. In some embodiments, the roadway management system 115 can independently determine the priority associated with a request to use a roadway rather than rely upon the vehicle 105 to request a particular priority.

The request generated by the autonomous vehicle controller 160 can also include a requested velocity, a requested time or time range during which the vehicle 105 is requesting to enter or arrive at the roadway, or any other request parameters. At box 318, the autonomous vehicle controller 160 can obtain a roadway assignment 187 associated with the request to use roadway from the roadway management system 115. The roadway assignment 187 can identify a lane assignment within the roadway, a time or time range at which the vehicle 105 can enter the roadway and a velocity or velocity range that the vehicle 105 is permitted to maintain during its use of the roadway.

At box 321, the autonomous vehicle controller 160 can generate routing instructions based upon the roadway assignment 187. The routing instructions can instruct the drive system 163 to maneuver the vehicle 105 to the roadway and enter the roadway in the lane specified by the roadway assignment 187. In some examples, based upon the time or time range specified by the roadway assignment 187, the autonomous vehicle controller 160 may have to instruct the vehicle 105 to reduce or increase its velocity so that the vehicle 105 enters the roadway at the time specified by the roadway assignment 187. Thereafter, the process ends.

Figure 4:
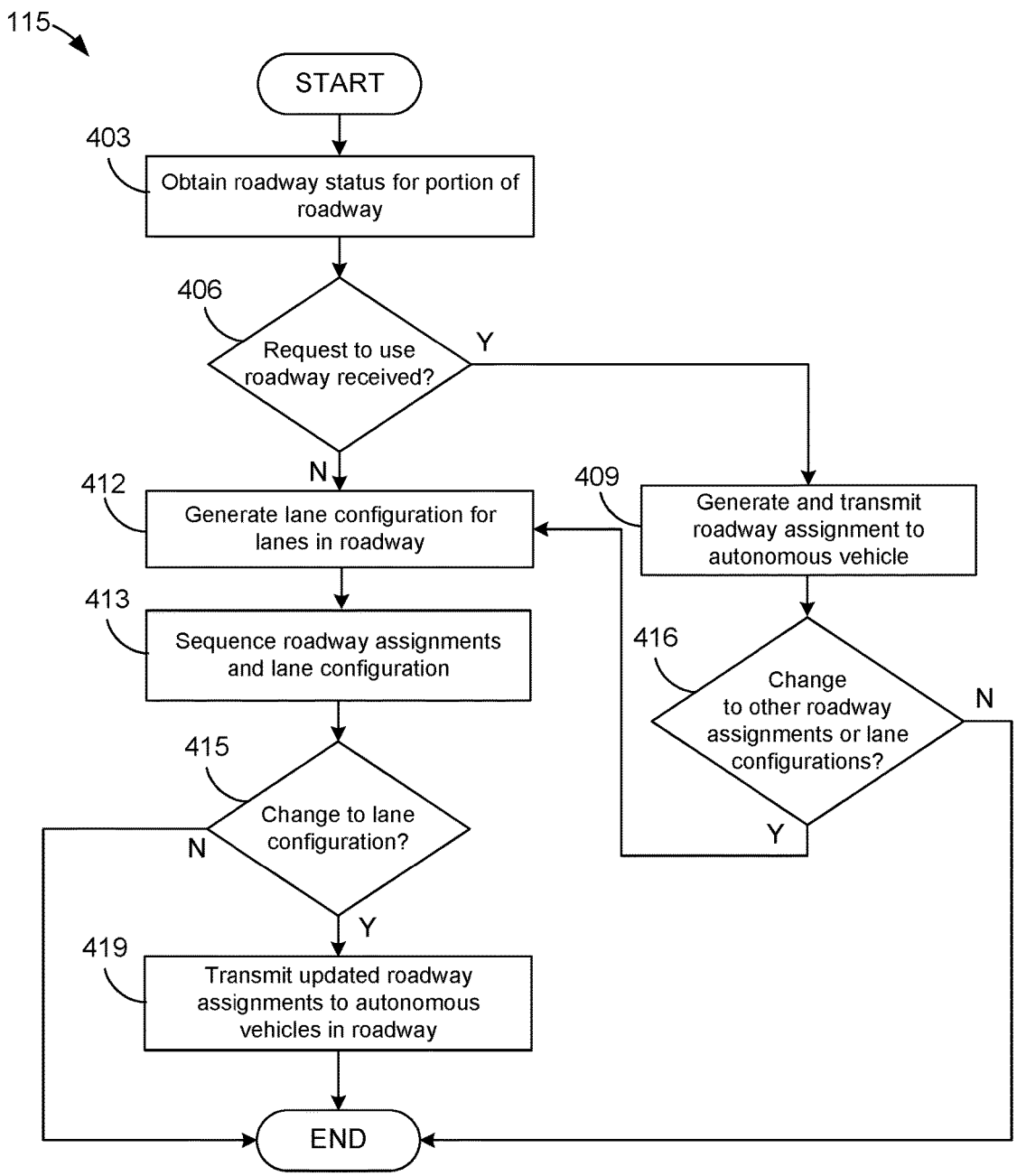
FIG. 4 is a flowchart illustrating one example of functionality implemented as portions of a roadway management system executed in the computing environment in the networked environment of FIGS. 1A-1C and 2 according to various embodiments of the present disclosure.

Referring next to FIG. 4, shown is a flowchart that provides one example of the operation of a portion of the roadway management system 115 according to various embodiments. It is understood that the flowchart of FIG. 4 provides merely an example of the many different types of functional arrangements that may be employed to implement the operation of the portion of the roadway management system 115 as described herein. As an alternative, the flowchart of FIG. 4 may be viewed as depicting an example of elements of a method implemented in the computing environment 103 according to one or more embodiments.

FIG. 4 provides a non-limiting example of the functionality that may be performed by the roadway management system 115. Specifically, FIG. 4 provides a non-limiting example of how the roadway management system 115 can generate a roadway assignment 185 for a vehicle 105. FIG. 4 also presents one iteration of a process that can be executed continuously by the roadway management system 115 in order to generate and update roadway assignments 187 as well as lane configurations 151. First, at box 403, the roadway management system 115 can obtain a roadway status 148 associated with the roadway or portion of a roadway that it is managing. At box 406, the roadway management system 115 can determine whether a request to use the roadway has been received from a vehicle 105. If so, then at box 409, the roadway management system 115 can generate and transmit a roadway assignment 187 to the vehicle 105. Otherwise, the process proceeds to box 412.

At box 409, the roadway management system 115 can generate the roadway assignment 187 by taking into account the roadway status 148 and the vehicle data 184 provided with the request. The roadway management system 115 can also take into account factors associated with the vehicle that is based upon the vehicle data 184 and a priority associated with the request. The roadway management system 115 can also take into account a roadway cost function 157 associated with the roadway. The cost function can take into account weighted factors associated with a vehicle, occupants of the vehicle, lanes of the roadway, and the environment in which the roadway is situated at any given point in time. The roadway assignment 187 is also generated to optimize for the outcome directive 155 that is associated with the roadway at the time the vehicle 105 is requesting to use the roadway. Next, at box 416, the roadway management system 115 can determine whether the roadway assignment 187 generated at box 409 causes a change in the roadway assignments 187 of other vehicles or in the lane configurations 151 of the roadway. If so, the process proceeds to box 412.

At box 412, the roadway management system 115 can generate lane configurations 151 for the roadway. As noted above, the lane configurations 151 can take into account the roadway status 148, the number of vehicles using or requesting to use the roadway, their respective directions of travel, and the outcome directive 155. At box 413, the roadway management system 115 can sequence the lane configurations 151 and roadway assignments 187. The lane configurations 151 and roadway assignments 187 can be sequenced to ensure that any transition in a lane configuration 151 or a roadway assignment 187 occurs in an appropriate order. In one embodiment, a lane configuration 151 or roadway assignment 187 can be associated with a timestamp that specifies when a particular change to a lane configuration 151 or roadway assignment 187 should occur.

At box 415, the roadway management system 115 can determine whether there is a change in the lane configurations 151 associated with the roadway. If so, then at box 419, the roadway management system 115 can transmit updated roadway assignments 187 to the vehicles 105 using the roadway as well as specify updated lane configurations 151 for the roadway. Thereafter, the process proceeds to completion.

Figure 5:
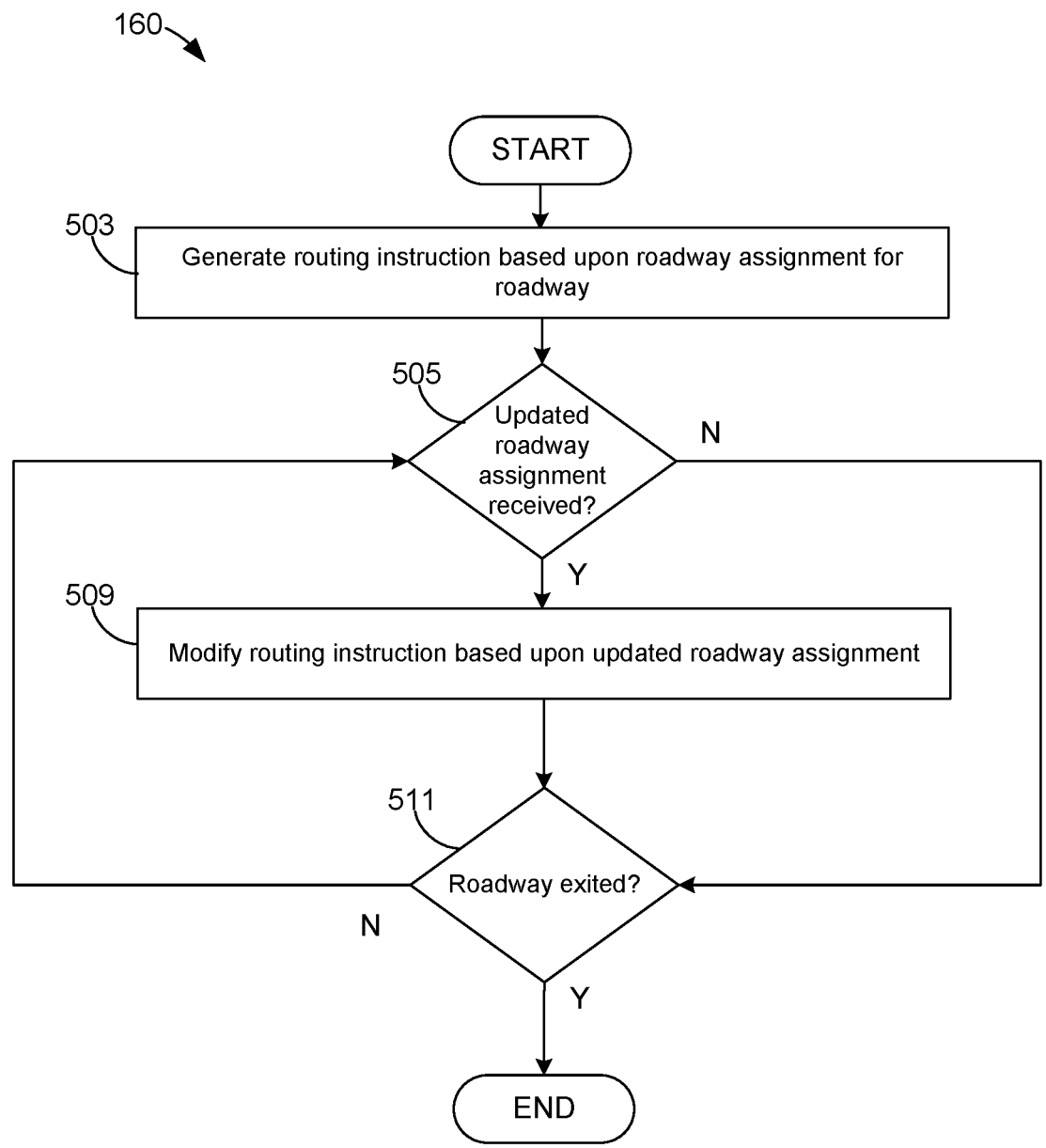
FIG. 5 is a flowchart illustrating one example of functionality implemented as portions of an autonomous vehicle controller executed in a vehicle in the networked environment of FIGS. 1A-1C and 2 according to various embodiments of the present disclosure.

Referring next to FIG. 5, shown is a flowchart that provides one example of the operation of another portion of the autonomous vehicle controller 160 according to various embodiments. It is understood that the flowchart of FIG. 5 provides merely an example of the many different types of functional arrangements that may be employed to implement the operation of the portion of the autonomous vehicle controller 160 as described herein. As an alternative, the flowchart of FIG. 5 may be viewed as depicting an example of elements of a method implemented in the vehicle 105 according to one or more embodiments.

FIG. 5 illustrates an example of how the autonomous vehicle controller 160 can generate routing instructions based upon roadway assignments received from the roadway management system 115 until exiting the roadway. Beginning with box 503, the autonomous vehicle controller 160 can generate a routing instruction based upon the roadway assignment received from a roadway management system 115. Next, at box 505, the autonomous vehicle controller 160 can determine whether an updated roadway assignment has been received from the roadway management system 115. If so, then at box 509, the autonomous vehicle controller 160 can generate an updated routing instruction that causes the vehicle 105 to move to comply with the updated roadway assignment. If not, the process can proceed to box 511. If, at box 511, the autonomous vehicle controller 160 has determined that the vehicle 105 has not exited the roadway, the autonomous vehicle controller 160 can return to box 505 and determine whether an updated roadway assignment was received from the roadway management system 115. If, at box 511, the autonomous vehicle controller 160 has determined that the vehicle 105 has exited the roadway, the process can proceed to completion.

Figure 6:
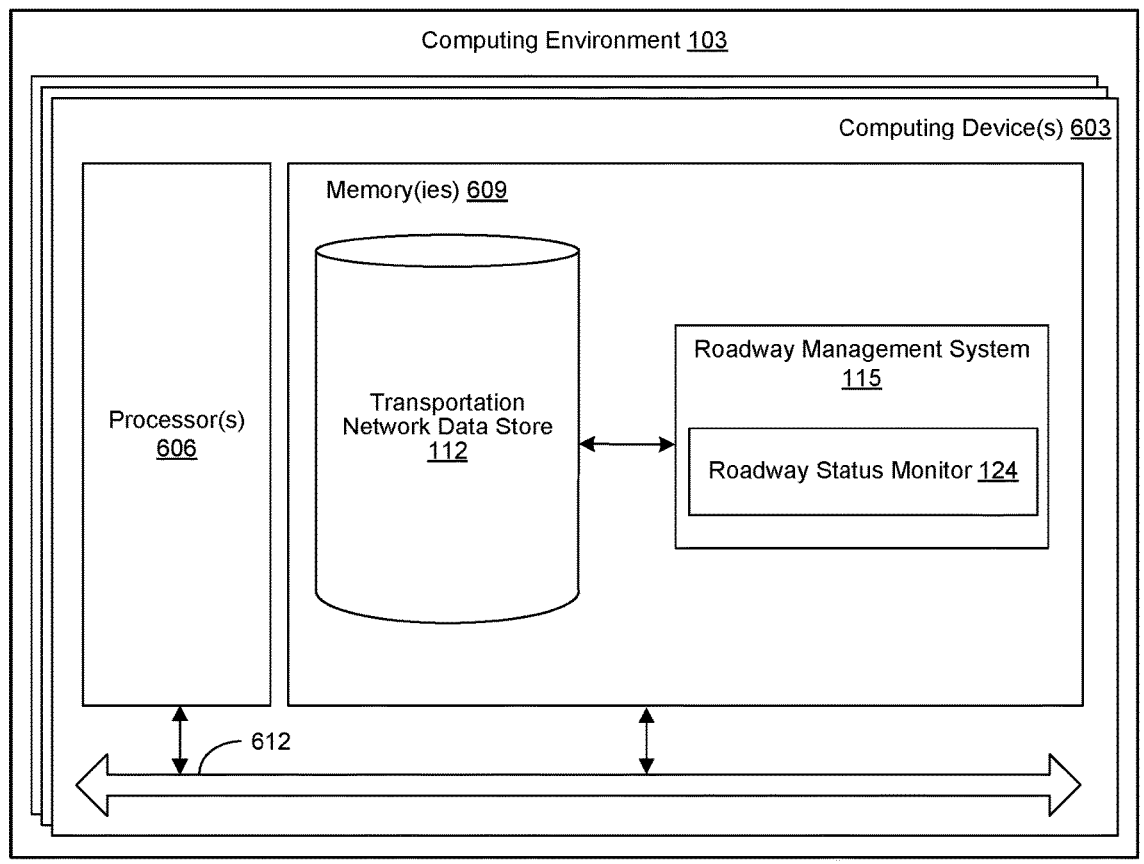
FIG. 6 is a schematic block diagram that provides one example illustration of a computing environment employed in the networked environment of FIGS. 1A-1C and 2 according to various embodiments of the present disclosure.

With reference to FIG. 6, shown is a schematic block diagram of the computing environment 103 according to an embodiment of the present disclosure. The computing environment 103 includes one or more computing devices 603. Each computing device 603 includes at least one processor circuit, for example, having a processor 606 and a memory 609, both of which are coupled to a local interface 612. To this end, each computing device 603 may comprise, for example, at least one server computer or like device. The local interface 612 may comprise, for example, a data bus with an accompanying address/control bus or other bus structure as can be appreciated.

Stored in the memory 609 are both data and several components that are executable by the processor 606. In particular, stored in the memory 609 and executable by the processor 606 are the roadway management system 115, the roadway status monitor 124, and potentially other applications. Also stored in the memory 609 may be a transportation network data store 112 and other data. In addition, an operating system may be stored in the memory 609 and executable by the processor 606.

It is understood that there may be other applications that are stored in the memory 609 and are executable by the processor 606 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 609 and are executable by the processor 606. In this respect, the term "executable" means a program file that is in a form that can ultimately be run by the processor 606. Examples of executable programs may be, for example, a compiled program that can be translated into machine code in a format that can be loaded into a random access portion of the memory 609 and run by the processor 606, source code that may be expressed in proper format such as object code that is capable of being loaded into a random access portion of the memory 609 and executed by the processor 606, or source code that may be interpreted by another executable program to generate instructions in a random access portion of the memory 609 to be executed by the processor 606, etc. An executable program may be stored in any portion or component of the memory 609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 609 is defined herein as including both volatile and nonvolatile memory and data storage components. Volatile components are those that do not retain data values upon loss of power. Nonvolatile components are those that retain data upon a loss of power. Thus, the memory 609 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 606 may represent multiple processors 606 and/or multiple processor cores and the memory 609 may represent multiple memories 609 that operate in parallel processing circuits, respectively. In such a case, the local interface 612 may be an appropriate network that facilitates communication between any two of the multiple processors 606, between any processor 606 and any of the memories 609, or between any two of the memories 609, etc. The local interface 612 may comprise additional systems designed to coordinate this communication, including, for example, performing load balancing. The processor 606 may be of electrical or of some other available construction.

Although the roadway management system 115, roadway status monitor 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the roadway management system 115 and the autonomous vehicle controller 160. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 606 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including roadway management system 115 and roadway status monitor 124, that comprises software or code can be embodied in any non-transitory computer-readable medium for use by or in connection with an instruction execution system such as, for example, a processor 606 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the roadway management system 115, roadway status monitor 124, and the autonomous vehicle controller 160, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 603, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An autonomous vehicle controller, comprising:
one or more processors; and
memory to store computer-executable instructions that, when executed, cause the one or more processors to at least:
obtain environmental conditions associated with an autonomous vehicle, wherein the environmental conditions comprise at least a current location of the autonomous vehicle;

generate a request to use a portion of a roadway between the current location of the autonomous vehicle and a destination of the autonomous vehicle;

transmit the request to use the portion of the roadway to a roadway management system associated with the portion of the roadway;

obtain a roadway assignment associated with the portion of the roadway from the roadway management system; and generate a routing instruction for the autonomous vehicle in response to receiving the roadway assignment.

2. The autonomous vehicle controller of claim 1, wherein the routing instruction is based at least in part upon the roadway assignment, and wherein the routing instruction specifies a direction of travel in a respective lane of the portion of the roadway.

3. The autonomous vehicle controller of claim 1, wherein the request to use the portion of the roadway comprises at least one of a request to park the autonomous vehicle in a location at the destination or a request to park the autonomous vehicle within the portion of the roadway.

4. The autonomous vehicle controller of claim 1, wherein the request comprises a priority associated with the autonomous vehicle.

5. A roadway management system, comprising:
at least one computing device; and
at least one application executed in the at least one computing device, the at least one application being configured to cause the at least one computing device to perform a method comprising:
obtaining, via a plurality of roadway sensors, a roadway status associated with a portion of a roadway;
obtaining, via a wireless communications interface, a request from an autonomous vehicle from a plurality of autonomous vehicles to use the portion of the roadway;
generating, based at least in part upon the roadway status and the request, a lane configuration for a plurality of lanes for the portion of the roadway;
generating, based at least in part upon an outcome directive associated with the portion of the roadway, a roadway assignment for the autonomous vehicle taking into account parameters of the request and the roadway status; and
causing, via the wireless communications interface, the roadway assignment to be communicated to the autonomous vehicle.

6. The roadway management system of claim 5, wherein the plurality of roadway sensors comprise at least one image capture device configured to capture imagery of the portion of the roadway.

7. The roadway management system of claim 5, wherein generating the roadway assignment for the autonomous vehicle is further based at least upon a cost function associated with the roadway, the cost function associated with the roadway based upon at least one of:
a number of lanes in the portion of the roadway, a speed limit associated with the portion of the roadway, a quantity of autonomous vehicles in the portion of the roadway, or a throughput metric associated with the portion of the roadway.

8. The roadway management system of claim 5, wherein the roadway assignment for the autonomous vehicle is generated based at least in part upon vehicle data associated with the autonomous vehicle, and wherein the vehicle data comprises at least one of:
a number of occupants of the autonomous vehicle, an efficiency of the autonomous vehicle, a timestamp associated with the request, a cost per mile associated with the autonomous vehicle, or a cost associated with the request.

9. The roadway management system of claim 5, wherein generating the roadway assignment for the autonomous vehicle further comprises:
generating a lane assignment for the autonomous vehicle, wherein the lane assignment specifies a lane having a lane configuration consistent with a destination associated with the request; and
determining a time and velocity associated with the lane assignment.

10. The roadway management system of claim 9, wherein the lane configuration specifies a direction of travel for each of the plurality of lanes based upon the roadway status, a quantity of the plurality of autonomous vehicles in the portion of the roadway, and the request from the autonomous vehicle.

11. The roadway management system of claim 5, wherein the at least one application is further configured to cause the at least one computing device to reverse a direction of travel for a respective one of the plurality of lanes based upon at least one of:
a time of day or traffic conditions associated with the portion of the roadway.

12. The roadway management system of claim 5, wherein the at least one application is further configured to cause the at least one computing device to modify another roadway assignment of another autonomous vehicle of the plurality of autonomous vehicles in response to receiving the request to use the portion of the roadway, and wherein modifying the roadway assignment comprises generating an instruction to change from a first lane to a second lane of the plurality of lanes.

13. The roadway management system of claim 12, wherein the other roadway assignment of the other autonomous vehicle is modified in response to a determination that a priority of the request to use the roadway associated with the autonomous vehicle is a higher priority than a respective priority associated with the other autonomous vehicle.

14. The roadway management system of claim 5, wherein the outcome directive comprises maximizing a number of autonomous vehicles or an average velocity of autonomous vehicles traveling through the portion of the roadway over a period of time.

15. The roadway management system of claim 5, wherein the outcome directive comprises maximizing a revenue metric associated with the portion of the roadway over a period of time.

16. The roadway management system of claim 5, wherein the lane configuration comprises at least one of:
a parking lane configuration, a direction of travel in a first direction, a direction of travel in a second direction, a width of a respective lane of the portion of the roadway, or an emergency lane configuration.

17. A method comprising:
obtaining environmental conditions associated with an autonomous vehicle, wherein the environmental conditions comprise a current location of the autonomous vehicle;
generating a request to use a portion of a roadway between the current location of the autonomous vehicle and a destination of the autonomous vehicle;

transmitting the request to use the portion of the roadway to a roadway management system associated with the portion of the roadway;

obtaining a first roadway assignment associated with the portion of the roadway from the roadway management system; and generating a first routing instruction for the autonomous vehicle in response to receiving the first roadway assignment.

18. The method of claim 17, wherein the first roadway assignment comprises at least one of a lane assignment, a velocity, a velocity range, or a direction of travel with respect to the portion of the roadway.

19. The method of claim 17, further comprising:

receiving a second roadway assignment associated with the portion of the roadway; and generating a second routing instruction for the autonomous vehicle in response to receiving the second roadway assignment.

20. The method of claim 17, further comprising:

identifying the roadway management system associated with the portion of the roadway based upon mapping data obtained by a controller.

21. The method of claim 17, wherein the request to use the portion of the roadway comprises at least one of a request to park the autonomous vehicle at a destination location or a request to park the autonomous vehicle within the portion of the roadway.

\* \* \* \* \*